United States Patent
Roberts et al.

(10) Patent No.: US 7,155,128 B2
(45) Date of Patent: Dec. 26, 2006

(54) DECORRELATION OF WDM SIGNALS

(75) Inventors: Kim B. Roberts, Nepean (CA);
Wolfgang Oberhammer, Ottawa (CA);
Maurice S. O'Sullivan, Ottawa (CA);
Roland A. Smith, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 742 days.

(21) Appl. No.: 10/014,353

(22) Filed: Dec. 14, 2001

(65) Prior Publication Data
US 2004/0208565 A1 Oct. 21, 2004

(51) Int. Cl.
*H04J 14/02* (2006.01)

(52) U.S. Cl. ............... 398/79; 398/68; 398/154

(58) Field of Classification Search ........... 398/154, 398/91, 102, 161, 79, 68, 42
See application file for complete search history.

(56) References Cited

U.S. PATENT DOCUMENTS

| | | | |
|---|---|---|---|
| 6,181,449 B1 | 1/2001 | Taga et al. | 359/124 |
| 6,181,858 B1 | 1/2001 | Kato et al. | 385/123 |
| 6,323,993 B1 * | 11/2001 | Hansen et al. | 359/337 |
| 6,381,048 B1 * | 4/2002 | Chraplyvy et al. | 398/79 |
| 6,414,772 B1 * | 7/2002 | Miyazaki | 398/91 |
| 6,417,958 B1 * | 7/2002 | Du et al. | 359/334 |
| 6,614,950 B1 * | 9/2003 | Huang et al. | 385/15 |
| 6,618,395 B1 * | 9/2003 | Kimmitt | 370/473 |
| 6,619,867 B1 * | 9/2003 | Asahi | 398/154 |
| 6,856,768 B1 * | 2/2005 | Gnauck et al. | 398/83 |

* cited by examiner

Primary Examiner—David C. Payne
(74) Attorney, Agent, or Firm—Kent Daniels; Ogilvy Renault LLP

(57) ABSTRACT

A method and system for reducing non-linear signal degradation effects of WDM optical signals exacerbated by highly correlated bit patterns of optical waveforms in neighboring optical channels. Embodiments include offsetting the transmission times of signals in neighboring channels, and applying different scrambling patterns to the respective data streams prior to transmission on neighboring optical channels.

32 Claims, 2 Drawing Sheets

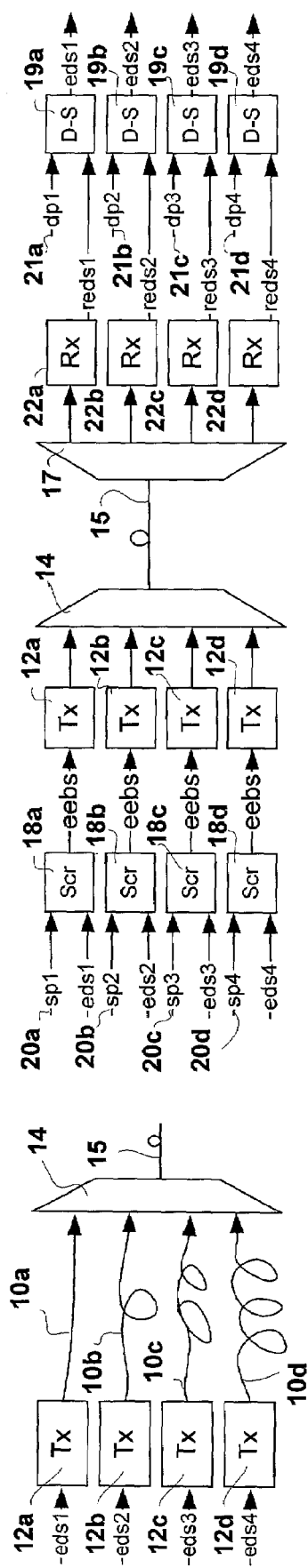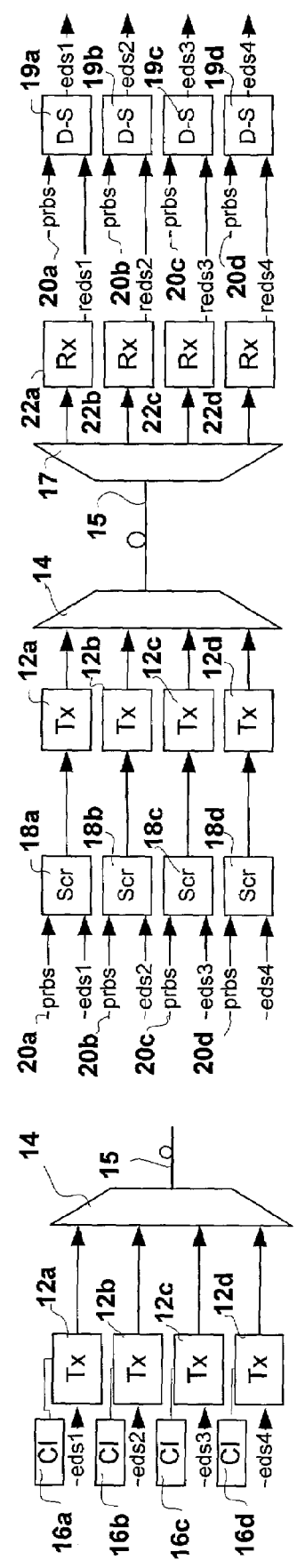

DECORRELATION OF WDM SIGNALS

CROSS-REFERENCE TO RELATED APPLICATIONS

This is the first application filed for the present invention.

MICROFICHE APPENDIX

Not applicable.

TECHNICAL FIELD

The invention relates to the field of wave division multiplexed (WDM) or dense wave division multiplexed (DWDM) optical signaling, and, in particular, to compensation for non-linear optical transmission effects that degrade WDM/DWDM optical signals.

BACKGROUND OF THE INVENTION

Degradation that occurs when wave division multiplexed (WDM) and dense wave division multiplexed (DWDM) optical signals are transmitted over a length of optical fiber is a primary concern in optical networking. There are many known factors that contribute to this degradation, and controlling each of those factors is necessary to successfully transmit a plurality of optical channels through an optical fiber. In particular, optical waveforms carried on optical channels are distorted by a plurality of non-linear optical transmission effects, including phenomena known as 4-wave mixing, and soliton WDM jitter, which are especially pronounced when the bit rate of the optical signal approaches or exceeds 20 Gb/s.

Methods and apparatus for reducing signal degradation due to non-linear optical transmission effects are taught in various patents, such as U.S. Pat. No. 6,181,858 entitled DISPERSION SHIFTED FIBER that issued to Kato et al. on Jan. 30, 2001, and U.S. Pat. No. 6,181,449 entitled WAVELENGTH DIVISION MULTIPLEXED OPTICAL PROCESSING DEVICE AND OPTICAL COMMUNICATIONS TRANSMISSION PATH that issued to Taga et al. on Jan. 30, 2001. These patents, as well as others, teach improvements to transmission using various physical layer devices and media. For example, controlled and select doping of optical fibers is taught in numerous United States patents, such as U.S. Pat. No. 6,181,858, to reduce 4-wave mixing. The use of waveguide correction devices taught in U.S. Pat. No. 6,181,449, limits non-linear optical transmission effects, such as those caused by soliton effects. However, these inventions concentrate on the physical layer of the optical network.

Other cost efficient methods for reducing the degradation of optical waveforms caused by four-wave mixing and soliton WDM jitter, remain highly desirable.

SUMMARY OF THE INVENTION

It is therefore an object of the present invention to provide a method and system for reducing wave division multiplexed (WDM) optical transmission effects like four-wave mixing and soliton WDM jitter, which degrade optical signals, and are exacerbated by correlation between bit patterns of neighboring optical waveforms that are aligned during transit over an optical fiber link.

Accordingly, a method is provided for generating a WDM optical signal in order to reduce non-linear signal degradation effects on neighboring optical channels. The method reduces correlation among the bit patterns of the data sent over neighbouring optical channels, and consequently reduces the non-linear effects such as 4-wave mixing and soliton WDM jitter. In particular, because of a higher than random probability that data sent over neighbouring optical channels will be highly correlated, the method controls the optical waveform generation process so that neighboring optical waveforms are delivered to a multiplexer in a condition that reduces the probability of correlation between bit patterns conveyed over neighboring optical channels. More particularly, the method involves controling either a (temporal) phase offset of the optical waveforms, or an encoding or scrambling applied to data prior to transmission on the respective optical channels.

The phase offset may be controlled by a selection of different optical path lengths for respective optical waveforms between a transmitter and multiplexer. The difference between the optical path lengths traversed by the neighboring optical waveforms ensures that the optical waveforms carried on neighboring optical channels are out of phase with respect to each other before multiplexing for transmission over the optical fiber link. The differences in optical path length for the neighboring optical waveforms are calculated so that dispersion in the optical fiber will not cause the optical waveforms carried on neighboring optical channels to be re-aligned during transit over the optical transmission medium.

The phase offset may alternatively be achieved by regulating transmitters of the respective optical waveforms to ensure that each transmitter transmits the optical waveforms at a respective temporal phase offset, with respect to phases of transmitters of neighboring optical waveforms. The phase regulation may be effected by ensuring that clock signals used to govern signal generation in respective transmitters, are out of temporal phase with respect to those of transmitters of neighboring optical channels. By staggering the transmission times of the respective optical waveforms, the preselected phase offset of neighboring optical waveforms can be achieved. This can be effected by offsetting clock signals provided to the respective transmitters. The clock signals that were used in the prior art to synchronize transmission of the respective optical waveforms are thus used to ensure a predetermined temporal offset between the transmissions of respective optical waveforms. The predetermined phase offset is selected to prevent dispersion from re-aligning the optical waveforms of neighboring optical channels during transit through the optical transmission medium.

Controlling the encoding involves applying different encoding schemes to electrical data signals received at transmitters of optical waveforms carried on neighboring optical channels. As is known in the art, transmitters receive an electrical data signal, and apply a scrambling pattern to the electrical data signal, prior to transmitting the data as an optical signal. In accordance with another embodiment of the method, a different scrambling pattern is applied to respective electronic data signals prior to transmission. The optical waveforms may then be sent synchronized over neighboring optical channels, because data bit correlation between neighboring data signals is reduced.

Different scrambling patterns may be generated autonomously, or in unison. In particular, one pseudo-random bit sequence may be used by all of the transmitters. Each transmitter receives the pseudo-random bit sequence and extracts a respective scrambling pattern therefrom, according to a respective predefined algorithm. The scrambling patterns are preferably not correlated at any alignment, so that two identical, and highly repetitious data signals yield encoded data signals that are substantially de-correlated at any alignment. For simplicity the extraction may involve removing a segment from the pseudo-random bit sequence.

A method is also provided for determining a decoding scheme to apply to data received through the optical signal. The decoding scheme may be determined using a hardware configuration setting, or reading a memory storing an a decoding scheme that was received in a message when a connection was commissioned. Alternatively, a search through a predefined set of decoding schemes may be performed. The search may be a heuristic search, guided by respective bit error rates of at least parts of results of an application of decoding schemes applied to the data.

The invention also provides a system for generating a WDM optical signal comprising an optical tranmsitter for generating a respective optical waveform for each channel in the WDM optical signal, a multiplexer for combining the plurality of optical waveforms to form the optical signal, and means for delivering the resepctive optical waveforms to the multiplexer in a condition in which a porbability of correlation between bit pattterns of the optical waveforms conveyed over neighboring ones of the optical channels is reduced.

The transmitters may be adapted to transmit the optical waveforms asynchronously with respect to optical waveforms carried on neighboring optical channels. Each of the transmitters comprises a clock signal offset circuit that offsets by a synchronizing clock signal by a predetermined time interval that is different than offsets applied by the time offset circuits of transmitters that transmit neighboring optical channels. The time interval is calculated to prevent dispersion from re-aligning the optical waveforms during transit through the optical fiber link.

The multiplexer is connected to the transmitters via respective optical patch cords, and instead of offsetting the clock signals, a difference in lengths of the optical patch cords can be used to ensure that the temporal offset is obtained at the multiplexer.

Alternatively, the data carried by the optical signals may be encoded or scrambled, so that correlated data signals are transmitted as uncorrelated optical signals. This is achieved using a scrambler for each transmitter, the scramblers being adapted to apply different scrambling patterns to optical waveforms that are transmitted on neighboring optical channels. The scranblers may further be adapted to extract respective scrambling patterns from a pseudo-random bit sequence, by applying respective, predefined algorithms.

BRIEF DESCRIPTION OF THE DRAWINGS

Further features and advantages of the present invention will become apparent from the following detailed description, taken in combination with the appended drawings, in which:

FIG. 1 schematically illustrates a first embodiment of the present invention relating to an offset;

FIG. 2 schematically illustrates a second embodiment of the present invention relating to an offset;

FIG. 3 schematically illustrates a third embodiment of the present invention relating to encoding;

FIG. 4 schematically illustrates a final embodiment of the present invention relating to encoding.

It will be noted that throughout the appended drawings, like features are identified by like reference numerals.

DETAILED DESCRIPTION OF THE PREFERRED EMBODIMENT

Figure 5:
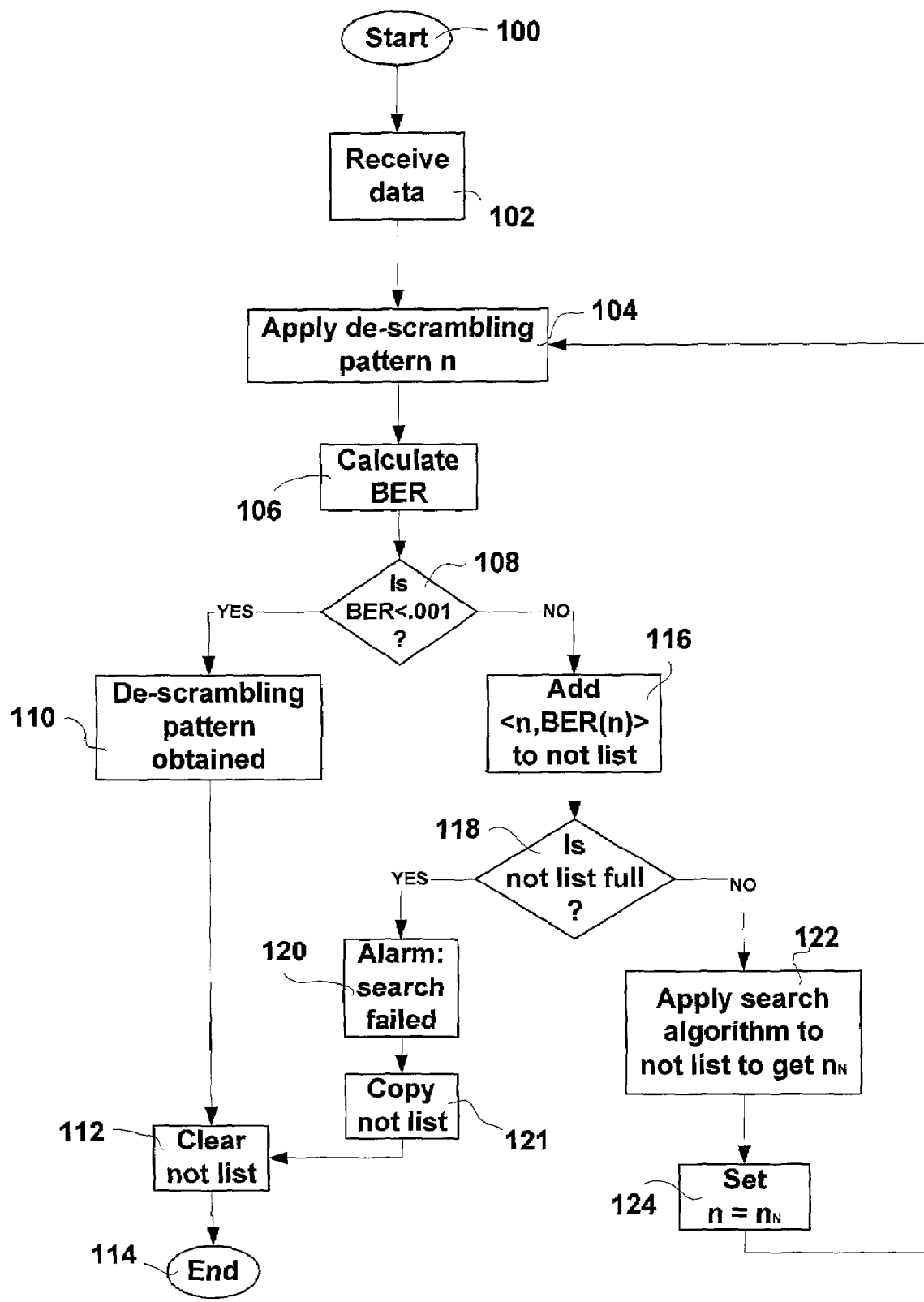
FIG. 5 is a flow chart illustrating principal steps involved in a procedure for obtaining a de-scrambler.

The invention provides a method and a system for reducing a correlation between bit patterns of optical waveforms carried on neighboring optical channels through an optical fiber in a dense wave division multiplexed (DWDM) optical network.

High correlation between bit patterns of neighboring optical channels has been found to increase the degradation of signals caused by certain non-linear transmission effects. In particular, four-wave mixing, and soliton wave division multiplexed (WDM) jitter, are exacerbated by high correlation between bit patterns on neighboring optical channels.

Correlation between two bit patterns is a statistical measurement of bit-wise similarity. The probability that a given bit in a first bit pattern is the same as a bit that is substantially aligned with the given bit of a second bit pattern, is referred to as correlation between the first and second bit patterns. It will be understood by persons skilled in the art, that alignment in this sense is a spatio-temporal relationship between high and low pulses that represent bits in an optical signal. As dispersion causes different optical channels to propagate at different speeds, two bits that are substantially aligned near a transmitter may be quite removed from each other near a receiver. For this reason many bit patterns of two neighboring optical DWDM signals are likely to be aligned during transit, especially as the number of transmitted bits per second increases.

The correlation of two bit patterns (given a particular alignment) is known to be a function of the two bit patterns. It is therefore impossible to eliminate the possibility that two bit patterns of two optical waveforms will align, unless each signal is encoded to explicitly reduce correlation. The cost and difficulty of generating encoding schemes, and communicating the encoding schemes to receivers of the optical waveforms, is impractical. Instead a reduction in the probability of correlation is sought, which requires prior knowledge of statistically probable bit patterns.

There is a statistically disproportionate number of circumstances under which identical, or highly correlated, data signals are conveyed. For example, the data signal conveyed by an empty channel is nearly all 0s. In the event of an alarm indication signal, mostly scrambled 1s are sent as data signals. Bridged channels have duplicate data, and packet idle signals and other network status messages are very similar and likely to be transmitted on neighboring channels in a WDM network. Certain video signals are also highly correlated. Given the probability of two highly correlated data signals being conveyed through neighboring channels in an optical fiber, the current practice of applying the same encoding to each data signal, and transmitting the encoded data signals in synchrony is incompatible with a desire to reduce non-linear transmission effects.

FIGS. 1–4 illustrate four exemplary embodiments of the present invention. Those skilled in the art will recognize that although the illustrated embodiments show 4 optical channels and, therefore, parts of 4 transmitter circuits, the invention is equally applicable to optical waveguides that carry any number of optical channels. As is known in the art, DWDM optical fiber links may concurrently convey more than one hundred optical channels.

FIG. 1 schematically illustrates a method that is particularly useful for reducing correlation within incumbent equipment. Optical fiber patch cords 10, convey optical waveforms transmitted by respective transmitters (Tx) 12 to an optical multiplexer 14, which is adapted to focus the optical waveforms carried by respective optical channels onto the WDM optical fiber link 15, to which it is connected.

The difference between lengths of the optical fiber patch cords 10 connecting neighboring transmitters 12 to the multiplexer 14 are calculated so that the well known effect of dispersion does not cause a re-alignment of the optical waveforms during transit over the optical fiber link 15. In some configurations, a length difference of 10 meters between adjacent patch cords, which induces a time delay of the order of tens of nanoseconds, has been found to be adequate.

In an embodiment schematically illustrated in FIG. 2, transmission of the optical waveforms is staggered by offsetting a synchronizing clock signal at the respective transmitters 12 by a predefined temporal phase offset. Respective clock offset circuits (Cl) 16 sent to respective transmitters (Tx) 12 are out of phase by a predefined time interval that is sufficient to ensure that dispersion does not cause a re-alignment of the optical waveforms during transit through an optical fiber link 15. The optical waveforms are generated by respective transmitters 12 out of synchronicity. A multiplexer 14 focuses the optical waveforms onto the optical fiber link 15.

FIG. 3 schematically illustrates a third embodiment of the invention. Each transmitter (Tx) 12 is connected to a respective scrambler 18. Each of the scramblers 18 receives an electronic data signal and a respective scrambling pattern (sp) 20*a, b, c, d*. Each scrambler 18 performs a reversible operation on the bits of the electronic data signal using the received scrambling pattern 20, producing an encoded electronic data signal (eeds) that is sent to a transmitter 12 connected to a respective scrambler 18.

Each scrambling pattern may be, for example, generated by a pseudo-random number generator. For instance, a known arrangement of interconnected linear feedback shift registers (LFSRs) with a predetermined key, as known in the art, may be used for this purpose. Changing the keys, or an arrangement of the LFSRs, yields different scrambling patterns for the respective scramblers 18. The respective scrambling patterns are applied to the respective electronic data signals by the respective scramblers 18. The scrambled signals are transmitted in synchrony as optical waveforms through parallel optical patch cords to a multiplexer 14 and then multiplexed onto an optical fiber link 15.

The optical signal carried over the optical fiber link is de-multiplexed by a demultiplexer 17. Each of the optical waveforms is received at a respective receiver 22*a, b, c, d*, that is adapted to generate an electrical data signal (reds) from the optical signal. The received electrical data signals is decoded at a descrambler 19*a, b, c, d*. Decoding the received electrical data signals involves applying an inverse of the reversible encoding operation performed by a respective scrambler 18*a, b, c, d* to the received optical waveforms. The reversible operation may be self inverting, in which case the descrambling pattern and the scrambling pattern are identical.

Given a plurality of scrambling patterns 20 are used, some means is required for obtaining the specific de-scrambling pattern 21 to apply to signals received on each channel. Several options are available. For example, each de-scrambler may use a de-scrambling pattern stored in memory, or extract the pattern from a message received when a connection supported by the optical channel is commissioned. Another way of obtaining the scrambling pattern 20, which can be used with WDM systems that use error checking techniques, is to perform a heuristic search through a provisioned set of de-scrambling patterns. The search is continued until a bit error rate of the de-scrambled signals falls below a predetermined threshold. A heuristic search for a scrambling pattern, in accordance with the present invention is further discussed with reference to FIG. 5.

It will be understood by those skilled in the art that various equivalent means for generating different data encoding strings are for use in systems in accordance with the invention. Scramblers 18 and de-scramblers 19 may be provisioned to use the same scrambling and de-scrambling patterns but applied in different ways. Any reversible encoding scheme that reduces the probability of data correlation on adjacent channels implement the present invention.

Another embodiment of the invention is schematically illustrated in FIG. 4. The embodiment shown in FIG. 4 differs from the one shown in FIG. 3 in that the scrambling patterns 18*a, b, c, d* shown in FIG. 3 are independently generated. In accordance with the embodiment shown in FIG. 4, however, each scrambler 18 applies a different part of a pseudo-random bit sequence to received data signals. Each of the different parts of the pseudo-random bit sequence is preferably defined by a respective phase. If it is generated by a collection of LFSRs, the pseudo-random bit sequence will constantly repeat, and consequently has no well-defined start or end. The pseudo-random bit sequence is preferably at least as long as an optical data frame, and repeats with the same frequency, so that a same (portion of a) pseudo-random bit sequence is applied to successive frames. In accordance with this embodiment, however, a pseudo-random bit sequence that is longer than a frame is generated and broadcast to each of a plurality of scramblers 18*a, b, c, d*. The scramblers 18 are each adapted to select a respective bit string that is used as a scrambling pattern for encoding the data signal.

There are a number of algorithms that the scrambler 18 could use to generate the scrambling pattern from the pseudo-random bit sequence. However, in accordance with this embodiment, the algorithm selects a segment of the pseudo-random bit sequence identified by a phase (defined with respect to an arbitrarily chosen starting point). The phases used by the respective scramblers 18 that are connected to transmitters of neighboring optical channels are preferably non-overlapping, which means that the pseudo-random bit sequence has to be at least as long as n frames, where n is the number of neighboring optical channels. This is not strictly necessary, however, as a measure of overlap may be tolerated, and other algorithms could be used in alternative embodiments to use a shorter pseudo-random bit sequence, while still meeting the requirement that the scrambling patterns used for data signals that are transmitted over neighboring optical channels be substantially uncorrelated at any alignment.

Other than the fact that the scrambler is adapted to apply the algorithm to select the scrambling pattern from the pseudo-random bit sequence, the operation of the elements of the transmission part of the embodiment illustrated in FIG. 4 are the same as those of corresponding elements shown in FIG. 3.

A receiver 22 that receives an optical signal, sends the data to a de-scrambler 19. Like the scrambler 18, the de-scrambler 19 is adapted to receive the pseudo-random bit sequence and select a de-scrambling pattern in accordance with a predetermined algorithm. The de-scrambler 19 must determine which de-scrambling pattern to apply to the received data signal. In accordance with this embodiment, determining a scrambling pattern involves selecting the de-scrambling pattern from the pseudo-random bit sequence. Thus, knowledge of a phase of the pseudo-random bit sequence that was applied to the data signal by the scrambler 18 is required. The scrambling pattern 20 is used by the de-scrambler 19 to reverse the operation of the scrambler 18. The phase of the de-scrambler may be determined by any of the ways for obtaining a scrambling pattern described above with reference to FIG. 3.

FIG. 5 illustrates principal steps involved in performing a heuristic search guided by the bit error rate (BER) of results of applying candidate de-scrambling patterns to data of an optical signal. For the embodiments of the invention described with reference to FIGS. 3 and 4, one of the ways that a receiver may obtain a de-scrambling pattern applied to the data is by performing a heuristic search through a predefined set of de-scrambling patterns. The process starts in step 100 as data of an optical signal is received (step 102). In step 104 a de-scrambling pattern indexed by n is applied to the data. The de-scrambling pattern indexed by n is either a de-scrambling pattern previously obtained for the optical signal, or a default de-scrambling pattern, if the search for the de-scrambling pattern of last data signal failed, or the system was restarted.

The result of applying the de-scrambling pattern is a bit stream for which a bit error rate (BER) can be calculated. The BER is calculated in step 106. If, in step 108, it is determined that the BER is below a predetermined threshold, less than 0.001, for example, the de-scrambling pattern is assumed to be correct. The de-scrambler is therefore obtained (step 110), a "not list" (a list of de-scrambling patterns that are determined to not be the sought pattern) is cleared (step 112) and the procedure ends (step 114). Otherwise, an ordered pair <BER,n>, is added to the not list (step 116). If the not list then contains an ordered pair for each de-scrambling pattern (determined in step 118), an alarm signaling the failure of the search is issued (step 120), the not list is copied for failure analysis, and then cleared, and the procedure ends (step 114). Otherwise, the not list is used by a heuristic algorithm to determine a new candidate de-scrambling pattern, $n_N$ (step 122). In step 124, n is set to the value of $n_N$; and the process resumes at step 104.

The determination of the BER in an iteration of step 106 may involve only testing a statistically relevant portion of the data, to which the de-scrambling pattern is applied, and may further be expedited by performing multiple iterations in parallel. If this method of testing is used, the obtained de-scrambling pattern is then applied to the entire data stream. The heuristic preferably uses BERs of all iterations of the search to determine a next most likely scrambling pattern.

The embodiment(s) of the invention described above is(are) intended to be exemplary only. The scope of the invention is therefore intended to be limited solely by the scope of the appended claims.

We claim:

1. A method of transmitting a wave division multiplexed (WDM) optical signal through an optical communications network, the method comprising steps of:
    scrambling each one of a plurality of data signals using a respective unique scrambling pattern, each scrambling pattern being substantially de-correlated from the other scrambling patterns at any given offset; and
    transmitting the scrambled data signals through respective channels of the WDM optical signal.

2. A method as claimed in claim 1 wherein the step of encoding comprises steps of:
    generating a plurality of scrambling patterns; and
    applying each scrambling pattern to a respective one data signal.

3. A method as claimed in claim 2 wherein the step of applying each scrambling pattern comprises steps of, at each transmitter:
    aligning bits of the scrambling pattern with bits of the respective data signal with reference to a predefined starting point in the scrambling pattern; and
    applying a reversible Boolean operation to the aligned bits, to generate the scrambled data signal.

4. A method as claimed in claim 1, wherein the step of encoding each data signal comprises a step of:
    extracting each of the scrambling patterns from a pseudo-random bit sequence.

5. A method as claimed in claim 4 wherein the step of extracting comprises a step of removing segments from the pseudo-random bit sequence, each of the segments being used as a respective scrambling pattern.

6. A method as claimed in claim 1 further comprising a step of selecting a decoding scheme to apply to data received through each optical channel.

7. A method as claimed in claim 6 wherein the step of selecting comprises reading a hardware configuration setting in a decoder circuit of a receiver for the optical channel.

8. A method as claimed in claim 6 wherein the step of selecting comprises a step of reading a memory that stores a decoding scheme received in a message when the optical channel was commissioned.

9. A method as claimed in claim 6 wherein the step of selecting comprises a step of searching through a predefined set of decoding schemes adopted to decode data received on the optical channel.

10. A method as claimed in claim 9 wherein the step of performing a search procedure comprises at least one iteration of the steps:
    selecting a decoding scheme;
    applying the selected decoding scheme to at least a part of the data;
    calculating a bit error rate for the decoded data; and
    determining if the bit error rate is below a predetermined threshold.

11. A system for transmitting a wave division multiplexed (WDM) optical signal through an optical communications network, the system comprising:
    a respective scrambler for scrambling each one of a plurality of data signals using a respective unique scrambling pattern, wherein each scrambling pattern is substantially de-correlated from the other scrambling patterns at any given offset; and
    a transmitter for transmitting each scrambled data signal through a respective channel of the WDM optical signal.

12. The system as claimed in claim 11 further comprising a receiver that includes a descrambler that selects a decoding scheme to apply to data received on the optical channels.

13. The system as claimed in claim 12 wherein the descrambler comprises a decoder circuit having a hardware configuration setting that provides the decoding scheme to apply to data received.

14. The system as claimed in claim 12 wherein the descrambler comprises a memory that stores a decoding scheme received in a message when the optical channel was commissioned.

15. The system as claimed in claim 12 wherein the receiver comprises a memory that stores a predefined set of decoding schemes adapted to decode data received on the optical channel and the set of decoding schemes is searched to select the decoding scheme to apply to the data received.

16. The system as claimed in claim 15 wherein the descrambler searches the decoding schemes by applying a selected one of the decoding schemes to at least a part of the data; calculating a bit error rate for the decoded data; and determining whether the bit error rate is below a predetermined threshold.

17. The system as claimed in claim 15 wherein the descrambler aligns bits of a decoding pattern with bits of the data received with reference to a predefined starting point in the descrambling pattern, and applies a reversible Boolean operation to the aligned bits, to generate a decoded data signal.

18. A system as claimed in claim 11, wherein each scrambling pattern is extracted from a pseudo-random bit sequence.

19. A method of transmitting a WDM signal over an optical transmission system, comprising:
   generating a respective pseudo-random pattern for each of a plurality of optical transmitters at a common transmit site, wherein each pseudo-random pattern is substantially de-correlated from the other pseudo-random patterns at any given offset;
   at each optical transmitter, encoding a respective data signal using the respective pseudo-random pattern, and generating a corresponding encoded optical signal having a respective optical wavelength; and
   optically multiplexing the encoded optical signals to generate a composite optical signal.

20. A method as defined in claim 19, further comprising:
   transmitting the composite optical signal to a receive site of the optical transmission system;
   optically demultiplexing the composite optical signal to separate at least one encoded optical; and
   decoding the separated encoded optical signal.

21. A method as defined in claim 20, further comprising:
   configuring hardware at the transmit site to determine the respective pseudo-random patterns used for encoding by each optical transmitter; and
   configuring hardware at the receive site to determine a respective decoding scheme used for decoding each separated encoded optical signal.

22. A method as defined in claim 20, further comprising:
   selecting a key determining a respective pseudo-random pattern for an optical transmitter at the common transmit site upon commissioning a connection using the optical transmitter between said transmit site and said receive site;
   transmitting said key to said receive site upon commissioning said connection;
   determining a respective decoding scheme for use at the receive site from said transmitted key.

23. A method as defined in claim 22, further comprising storing said key in memory at said receive site.

24. A method as defined in claim 20, further comprising performing a heuristic search through a set of pseudo-random patterns stored at the receive site while monitoring an error rate of a signal decoded using each of the stored pseudo-random patterns, and fixing the pseudo-random pattern used for decoding when the monitored error rate falls below a predetermined threshold.

25. A method as defined in claim 20, wherein the step of encoding comprises:
   aligning data bits to be encoded with bits of the respective pseudo-random pattern; and
   applying a reversible Boolean operation to the aligned bits to generate a respective encoded data signal.

26. A system for transmitting a WDM signal over an optical transmission system, comprising:
   a pseudo-random pattern generator for generating a respective pseudo-random pattern for each one of a plurality of optical transmitters at a common transmit site, wherein each pseudo-random pattern is substantially de-correlated from the other pseudo-random patterns at any given offset;
   a respective encoder associated with each optical transmitter, for encoding a respective data signal using the respective pseudo-random pattern, the optical transmitter generating a corresponding encoded optical signal; and
   an optical multiplexer for optically multiplexing the encoded optical signals to generate a composite optical signal.

27. A system as defined in claim 26, further comprising:
   an optical transmission medium for transmitting the composite optical signal to a receive site of the optical transmission system;
   an optical demultiplexer for optically demultiplexing the received composite optical signal to separate at least one encoded optical signal; and
   at least one decoder for decoding the separated encoded optical signal.

28. A system as defined in claim 27, further comprising;
   hardware configured at the transmit site to determine the respective pseudo-random patterns used for encoding by each encoder; and
   hardware configured at the receive site to determine a respective decoding scheme used for decoding each separated encoded optical signal.

29. A system as defined in claim 27, further comprising:
   a key selector for selecting a key determining a respective pseudo-random pattern for an optical transmitter at the common transmit site upon commissioning a connection using the optical transmitter between said transmit site and said receive site and transmitting said key to said receive site upon commissioning said connection;
   the decoder at the receive site being operable to determine a respective decoding scheme for use at the receive site from said transmitted key.

30. A system as defined in claim 27 further comprising a memory for storing said key at said receive site.

31. A system as defined in claim 27, further comprising a channel monitor for performing a heuristic search through a set of pseudo-random patterns stored at the receive site while monitoring an error rate of a signal decoded using each of the stored pseudo-random patterns, and fixing the pseudo-random pattern used for decoding when the monitored error rate falls below a predetermined threshold.

32. A system as defined in claim 27, wherein the each encoder comprises:
   a phase shifter for aligning data bits to be encoded with bits of the respective pseudo-random pattern; and
   a logic unit for applying a reversible Boolean operation to the aligned bits to generate a respective encoded data signal.

* * * * *

UNITED STATES PATENT AND TRADEMARK OFFICE
CERTIFICATE OF CORRECTION

PATENT NO. : 7,155,128 B2 Page 1 of 1
APPLICATION NO. : 10/014353
DATED : December 26, 2006
INVENTOR(S) : Kim B. Roberts et al.

It is certified that error appears in the above-identified patent and that said Letters Patent is hereby corrected as shown below:

Column 9, claim 17 line 9, "claim 15" should read --claim 12--

Signed and Sealed this

Thirteenth Day of March, 2007

JON W. DUDAS
*Director of the United States Patent and Trademark Office*